United States Patent [19]
Dworkowski et al.

[11] Patent Number: 5,402,691
[45] Date of Patent: Apr. 4, 1995

[54] GANTRY-STYLE APPARATUS FOR POSITIONING A WORKING MEMBER WITH RESPECT TO PLURALITY OF "X" AND "Y" COORDINATE POSITIONS

[75] Inventors: Robert Dworkowski; Romulad Stoncel, both of Edmonton, Canada

[73] Assignee: R.D. Corporation Ltd., Edmonton, Canada

[21] Appl. No.: 119,488

[22] Filed: Sep. 13, 1993

[51] Int. Cl.$^6$ ............................................. G05G 11/00
[52] U.S. Cl. ................................. 74/490.09; 33/1 M; 414/749
[58] Field of Search ............... 74/89.2, 89.21, 89.22, 74/479 PF, 479 PH; 33/1 M; 901/16, 21; 414/749

[56] References Cited

U.S. PATENT DOCUMENTS

| | | | |
|---|---|---|---|
| 3,127,678 | 4/1964 | Muldoon | 33/1 M |
| 3,226,527 | 12/1965 | Harding | 219/384 |
| 3,258,776 | 6/1966 | Boyle et al. | 33/1 M X |
| 4,419,823 | 12/1983 | Thorban | 33/1 M |
| 4,553,016 | 11/1985 | Kunii et al. | 219/121 LG |
| 4,648,774 | 3/1987 | Dorumsgaard et al. | 901/16 X |
| 4,702,663 | 10/1987 | Mischke et al. | 414/749 X |
| 4,973,819 | 11/1990 | Thatcher | 219/121.78 |
| 5,011,282 | 4/1991 | Ream et al. | 356/153 |
| 5,049,723 | 9/1991 | Macdonald | 219/121.83 |
| 5,051,558 | 9/1991 | Sukhman | 219/121.68 |
| 5,148,600 | 9/1992 | Chen et al. | 33/1 M |
| 5,207,115 | 5/1993 | Takei | 269/73 X |

FOREIGN PATENT DOCUMENTS 2120202 11/1983 United Kingdom ................. 901/16

*Primary Examiner*—Allan D. Herrmann
*Attorney, Agent, or Firm*—Anthony R. Lambert

[57] ABSTRACT

A gantry-style apparatus for positioning a working member with respect to plurality of "X" and "Y" coordinate positions is described which includes a pair of parallel spaced apart "X" support members defining a plurality of "X" coordinate positions and a "Y" support member defining a plurality of "Y" coordinate positions. The "Y" support member extends transversely across the "X" support members and has a first end, a second end and a mid-point between the first end and a second end. A center-pull "X" drive system is provided for moving the "Y" support member axially along the "X" support members. A working member mounting is movably secured to the "Y" support member. A "Y" drive system is provided for moving the working member mounting axially along the "Y" support member. The "Y" support member is of a length which is greater than the spacing between the "X" support members, such that the "Y" support member has a first overhanging portion adjacent the first end and a second overhanging portion adjacent the second end which extend past the "X" support members. The apparatus as described is particularly suited for laser cutting applications.

3 Claims, 3 Drawing Sheets

GANTRY-STYLE APPARATUS FOR POSITIONING A WORKING MEMBER WITH RESPECT TO PLURALITY OF "X" AND "Y" COORDINATE POSITIONS

BACKGROUND OF THE INVENTION

A variety of manufacturing operations use gantry-style support structures. These support structures include an "X" support defining a plurality of "X" coordinate positions and a "Y" support defining a plurality of "Y" coordinate positions. An "X" drive system is provided for moving the "Y" support axially along the "X" support. A working member mounting suitable for the type of working member is movably secured to the "Y" support. A "Y" drive system is provided for moving the working member mounting axially along the "Y" support. By moving a combination of the working member mounting and the "Y" support the working member can be positioned at any desired "X-Y" coordinate point. By tying the "X" drive system and the "Y" drive system to a computer, the working member can be made to move in preprogrammed patterns. As the working member moves, the working member performs its intended task with respect to material placed on a working area positioned below the support structure. The type of working members can vary. Some examples are water jet or plasma cutting heads, laser focusing assemblies, welding apparatus, marking apparatus, glue dispensers, and robotic pick up arms.

Where speed is desirable in a cutting application, it is important that the support structure be able to withstand stresses created by a rapid acceleration and deceleration of the working member. Rapid acceleration and deceleration tend to vibrate the support structure and causes a flexing of the "Y" support. The flexing of the "Y" support adversely affects the accuracy of the movement of the working member and may result in binding occurring between the "Y" support and the "X" support. In an effort to facilitate an increase in the speed of the working member, a variety of alternate configurations of support structure have been developed. The configurations are generally described by the relative positioning of the "X" support and the "Y" support. Some of the more common configurations are "L" shaped, cross-shaped and "H" shaped. The "H" shaped configuration is generally considered to be less prone to both vibration and binding.

In an effort to increase speed without binding occurring in "H" shaped support structures a number of solutions have been tried. One solution to binding is the use of two synchronous motors at each end of the "Y" support. An example of this approach is U.S. Pat. No. 3,226,527 which was granted to Harding in 1965. The problem with this solution is that it is extremely difficult, if not impossible, to maintain two motors acting in unison through rapid acceleration and deceleration. Another solution is to use a single motor coupled by a shaft to drive assemblies at each end of the "Y" support. The problem with this solution is that as speed increases the torque exerted causes distortion of the shaft such that the ends of the "Y" support are no longer moved in unison and binding occurs.

SUMMARY OF THE INVENTION

What is required is a gantry-style apparatus for positioning a working member with respect to plurality of "X" and "Y" coordinate positions which is better suited to high speed operation.

According to the present invention there is provided a gantry-style apparatus for positioning a working member with respect to plurality of "X" and "Y" coordinate positions which includes a pair of parallel spaced apart "X" support members defining a plurality of "X" coordinate positions and a "Y" support member defining a plurality of "Y" coordinate positions. The "Y" support member extends transversely across the "X" support members and has a first end, a second end and a midpoint between the first end and a second end. A center-pull "X" drive system is provided for moving the "Y" support member axially along the "X" support members. A working member mounting is movably secured to the "Y" support member. A "Y" drive system is provided for moving the working member mounting axially along the "Y" support member. The "Y" support member is of a length which is greater than the spacing between the "X" support members, such that the "Y" support member has a first overhanging portion adjacent the first end and a second overhanging portion adjacent the second end which extend past the "X" support members.

It has been verified by computer stress analysis that having portions of the "Y" support member overhanging and extending past the "X" support members in combination with a single center-pull type of drive enables higher speeds to be attained without binding occurring. It will be apparent that this solution is much more cost effective than other attempted solutions, such as the use of synchronous motors.

Although beneficial results may be obtained through the use of the apparatus, as described above, even more beneficial results may be obtained when the "Y" support member has two point contact with each of the "X" support members. The two contact points are spaced axially along the "X" support members. This enables the "Y" support member to have a more stable "stance" in relation to the "X" support members, thereby better withstanding the stress of rapid acceleration and deceleration at the instance of the "X" drive system.

Although beneficial results may be obtained through the use of the apparatus, as described above, if flexing and the "whiplash" effect that comes with it can be reduced, speed can be further increased without losing positional accuracy. Even more beneficial results may, therefore, be obtained when the "X" drive system is attached off-center from the midpoint of the "Y" support member. The center-pull "X" drive system a slightly off-center attachment position is to be preferred as it reduces flexing of the "Y" support member.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
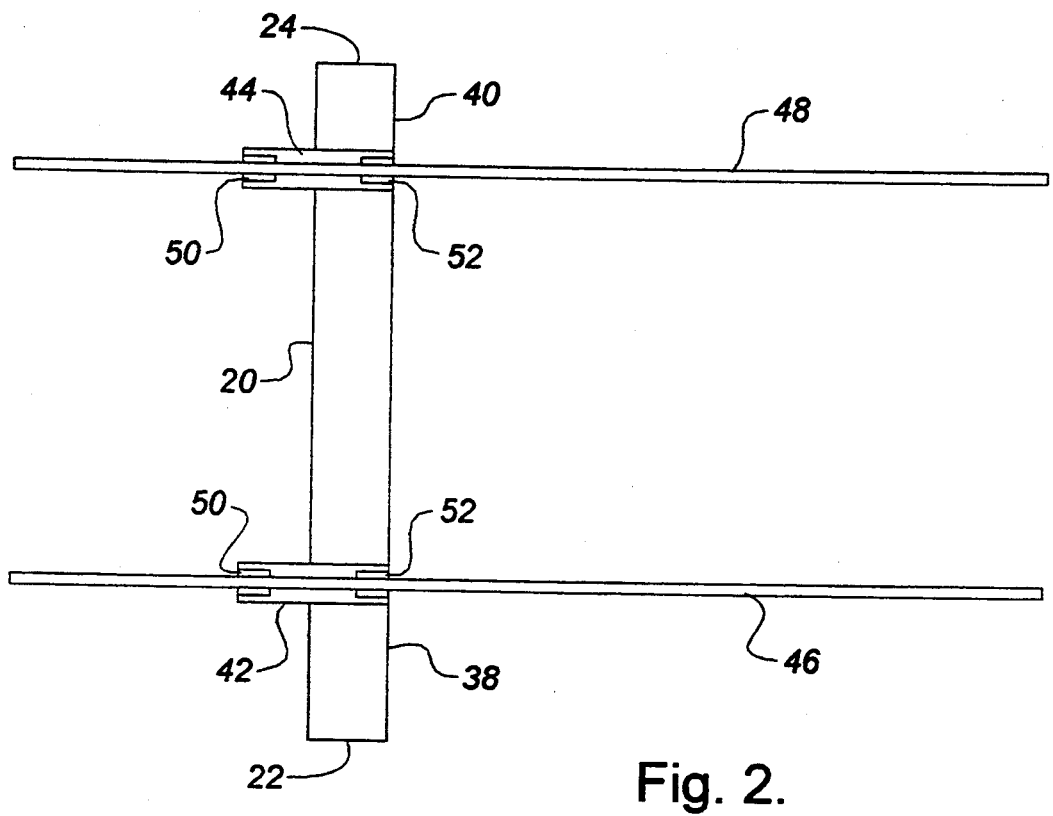
FIG. 2 is a top plan view in longitudinal section of the apparatus illustrated in FIG. 1.
Figure 3:
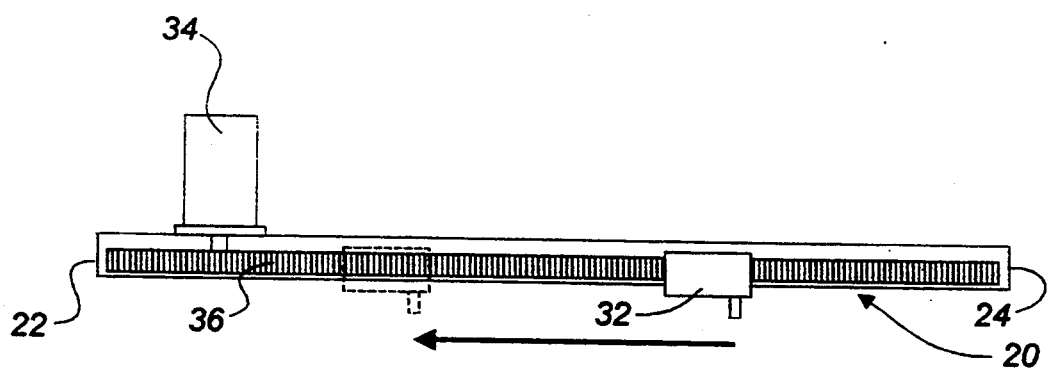
FIG. 3 is a end elevation view of the apparatus illustrated in FIG. 1 taken along section lines III—III.
Figure 4:
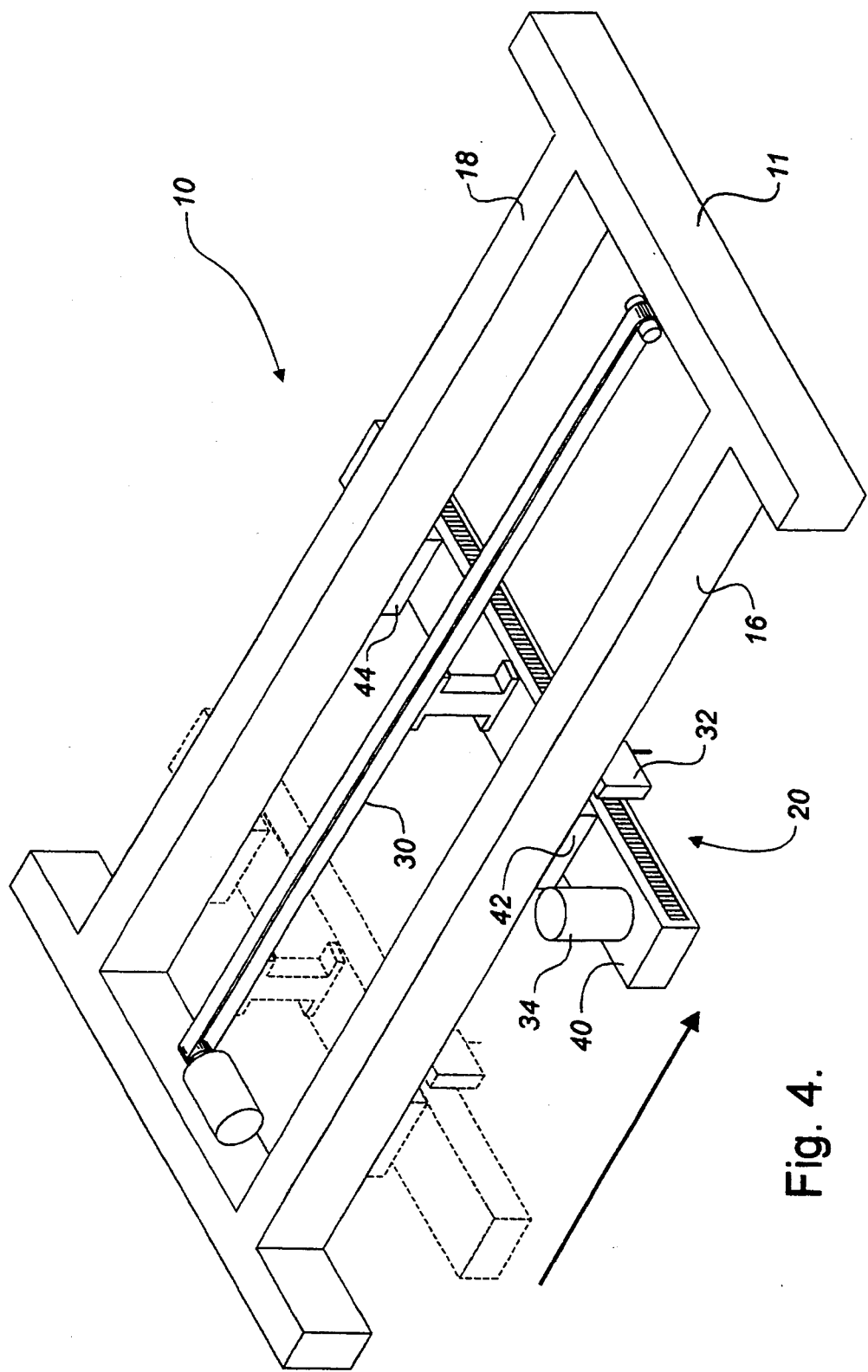
FIG. 4 is a perspective view of the apparatus illustrated in FIG. 1.

The preferred embodiment, a gantry-style apparatus for positioning a working member with respect to plurality of "X" and "Y" coordinate positions generally identified by reference numeral 10, will now be described with reference to FIGS. 1 through 3.

Figure 1:
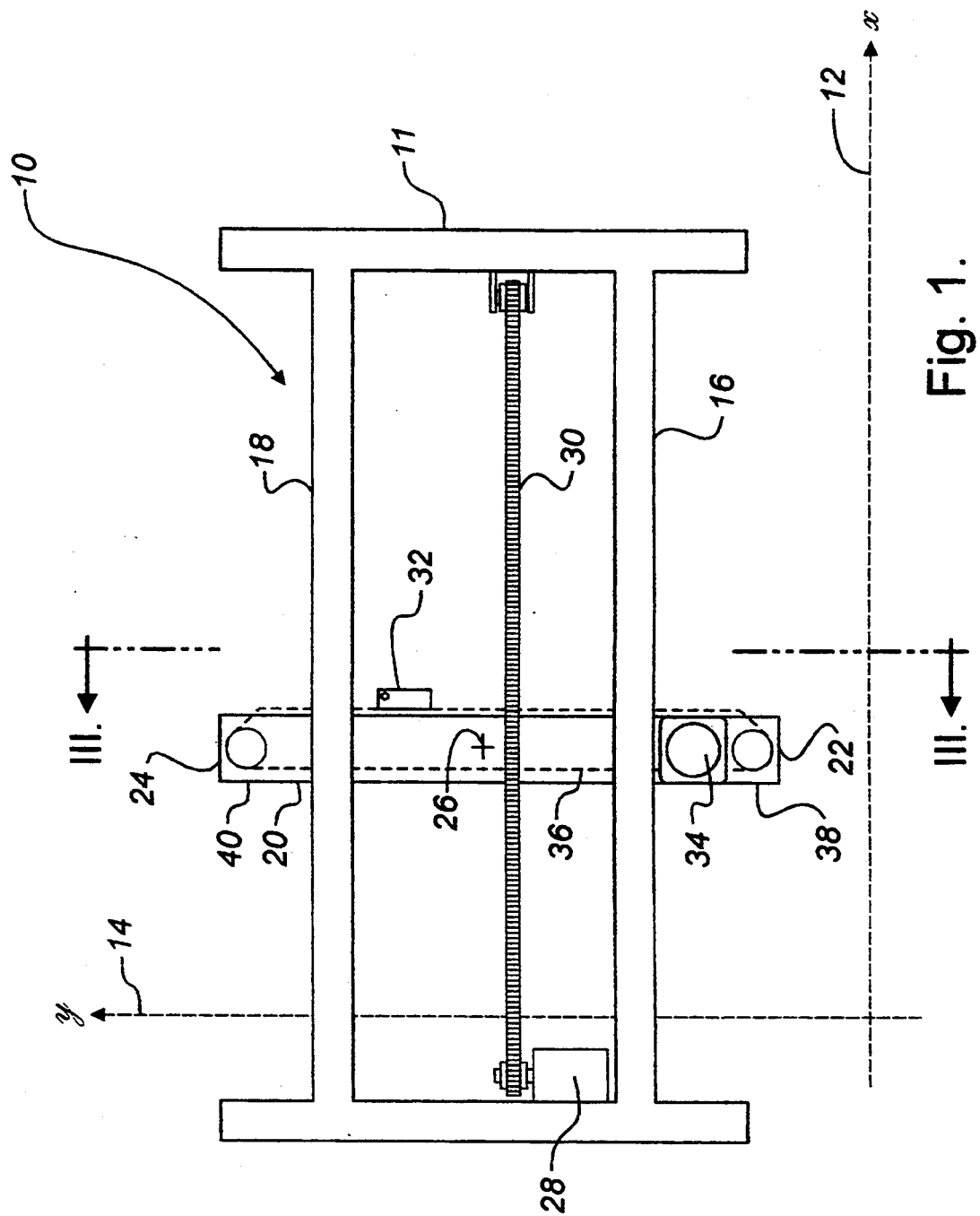
FIG. 1 is a top plan view of a gantry-style apparatus for positioning a working member constructed in accordance with the teachings of the present invention.

Referring to FIG. 1, apparatus 10 is illustrated, with an "X" coordinate axis 12 and a "Y" coordinate axis 14 superimposed. Apparatus 10 has a generally rectangular support frame 11 which includes a pair of parallel spaced apart "X" support members 16 and 18 which define a plurality of "X" coordinate positions. Rectangular support frame 11 is support over a workpiece by attachment in each of its four corners." A "Y" support member 20 is provided defining a plurality of "Y" coordinate positions. "Y" support member 20 extends transversely across "X" support members 16 and 18. "Y" support member 20 has a first end 22, a second end 24 and a mid-point 26 positioned between first end 20 and second end 24. A center pull "X" drive system consisting of "X" motor 28 and "X" timing belt 30 are provided for moving "Y" support member 20 axially along "X" support members 16 and 18. "X" timing belt 30 of the "X" drive system is attached off-centre from midpoint 26 of "Y" support member 20. Referring to FIG. 3, a working member mounting 32 is movably secured to "Y" support member 20. A "Y" drive system consisting of "Y" motor 34 and "Y" timing belt 36 are provided for moving working member mounting 32 axially along "Y" support member 20. Referring to FIGS. 1 and 2, "Y" support member 20 is of a length which is greater than the spacing between "X" support members 16 and 18 such that "Y" support member 20 has a first overhanging portion 38 adjacent first end 22 and a second overhanging portion 40 adjacent second end 24. First overhanging portion 38 and second overhanding portion 40 extend past "X" support members 16 and 18, respectively. Referring to FIG. 2, "X" support members 16 and 18 each have bearing rails 46 and 48, respectively. "Y" support member 20 is attached by mountings 42 and 44 to linear bearing rails 46 and 48, respectively. Each of mountings 42 and 44 have two point contact 50 and 52 with linear bearing rails 46 and 48, respectively. Contact points 50 and 52 are spaced axially in relation to linear bearing rail 46 of "X" support member 16 and linear bearing rail 48 of "X" support member 18.

The use and operation of apparatus 10 will now be described with reference to FIGS. 1 through 3. The apparatus, as described, is better able to withstand rapid acceleration and deceleration. When "Y" support member 20 has overhanging portions 38 and 40 in combination with a single center-pull type of drive higher speeds are reached without binding occurring. The speed can be further increased by taking measures to strengthen the stability of the engagement between "Y" support member 20 and "X" support members 16 and 18. One effective measure has proven to be the utilization of mountings 42 and 44 which have two point contact 50 and 52. With two point contact, as described, "Y" support member 20 is less prone to twisting during acceleration and deceleration. The speed can be even further increased by reducing the flexing of "Y" support member 20. One effective measure has proven to be attaching "X" timing belt 30 of the "X" drive system off-centre from midpoint 26 of "Y" support member 20. There is less flexing in this position than when "X" timing belt 30 is attached precisely at midpoint 26.

It will be apparent to one skilled in the art that the present invention has achieved a more stable configuration by moving "X" supports 16 and 18 of a conventional "H" configuration inwardly to leave overhanging portions 38 and 40; and utilizing a single center-pull type of "X" drive. It also will be apparent to one skilled in the art that modifications may be made to the illustrated embodiment without departing from the spirit and scope of the invention as defined by the claims. In particular, there are a variety of alternative drive systems to those illustrated. The basic solution invention having been shown and illustrated in one embodiment, a design optimization can be performed for alternate embodiments by computer stress analysis. For example, such factors as the attachment position of "Y" motor 34 may effect the optimum attachment position of "X" timing belt 30 to "Y" support member 20.

The embodiments of the invention in which an exclusive property or privilege is claimed are defined as follows:

1. A gantry-style apparatus for positioning a working member with respect to plurality of "X" and "Y" coordinate positions; comprising:
   a. a pair of parallel spaced apart "X" support members defining a plurality of "X" coordinate positions;
   b. a single rail-form "Y" support member defining a plurality of "Y" coordinate positions, the "Y" support member extending transversely across the "X" support members, the "Y" support member having a first end, a second end and a mid-point between the first end and a second end;
   c. an asymmetrical center pull "X" drive system for moving the "Y" support member axially along the "X" support members, the "X" drive system being attached off-centre from the midpoint of the "Y" support member;
   d. a working member mounting movably secured to the "Y" support member;
   e. a "Y" drive system for moving the working member mounting axially along the "Y" support member; and
   f. the "Y" support member being of a length which is greater than the spacing between the "X" support members such that the "Y" support member has a first overhanging portion adjacent the first end and a second overhanging portion adjacent the second end which extend past the "X" support members.

2. The gantry-style apparatus as defined in claim 1, wherein the "Y" support member has asymmetrical two point contact with each of the "X" support members, the two contact points being spaced axially along the "X" support members.

3. A gantry-style apparatus for positioning a working member with respect to plurality of "X" and "Y" coordinate positions; comprising:
   a. a generally rectangular support frame which includes a pair of parallel spaced apart "X" support members defining a plurality of "X" coordinate positions;
   b. a single rail-form "Y" support member defining a plurality of "Y" coordinate positions, the "Y" support member extending transversely across the "X" support members, the "Y" support member having asymmetrical two point contact with each of the "X" support members, the two contact points being spaced axially along the "X" support members, the "Y" support member having a first end, a second end and a mid-point between the first end and a second end;

c. an asymmetrical center pull "X" drive system for moving the "Y" support member axially along the "X" support members, the "X" drive system being attached off-centre from the midpoint of the "Y" support member;

d. a working member mounting movably secured to the "Y" support member;

e. a "Y" drive system for moving the working member mounting axially along the "Y" support member; and f. the "Y" support member being of a length which is greater than the spacing between the "X" support members such that the "Y" support member has a first overhanging portion adjacent the first end and a second overhanging portion adjacent the second end both of which extend past the "X" support members.

* * * * *